United States Patent Office

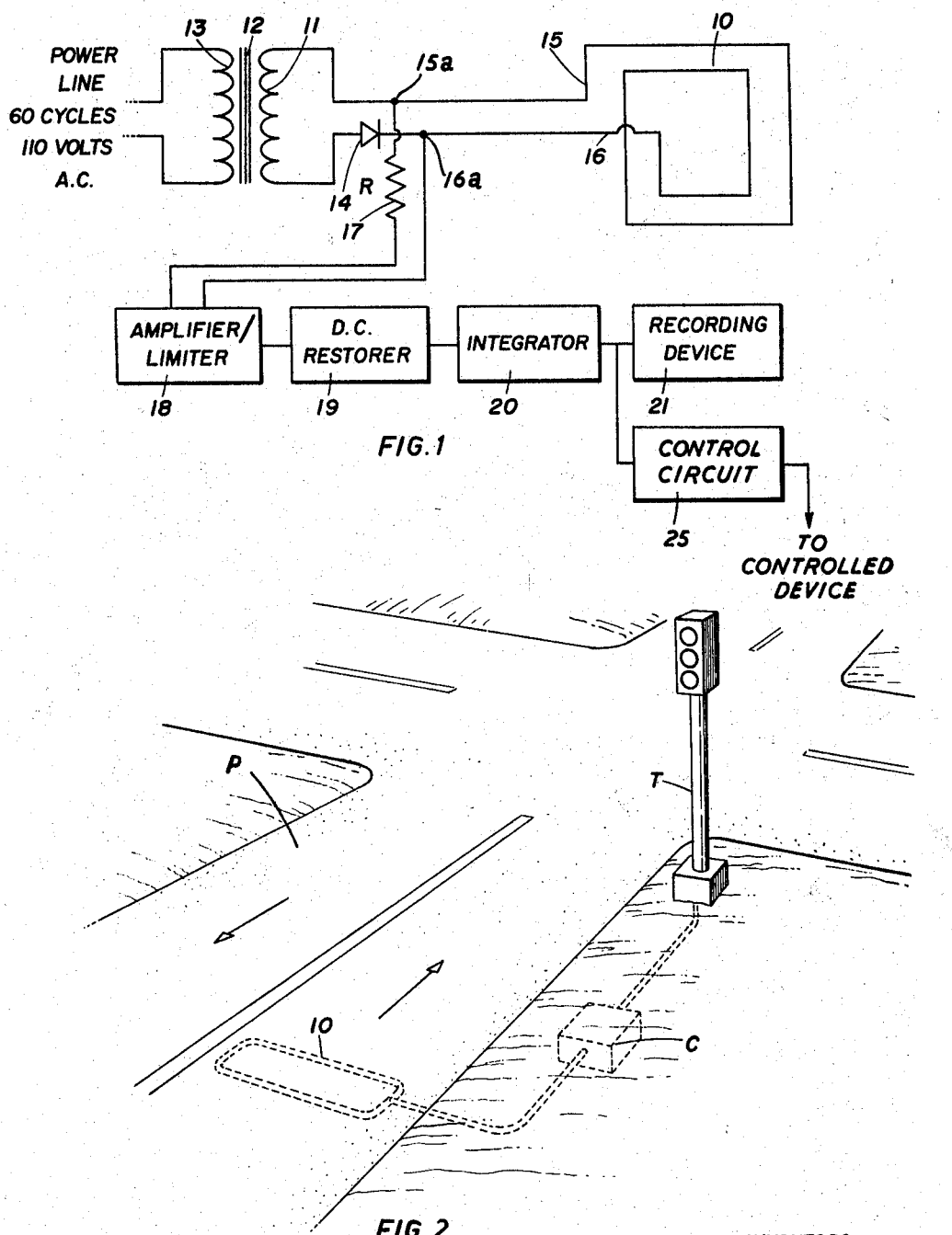

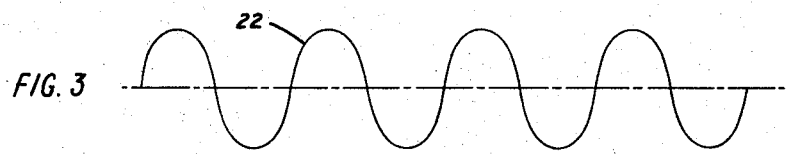
FIG. 3 — LINE CURRENT
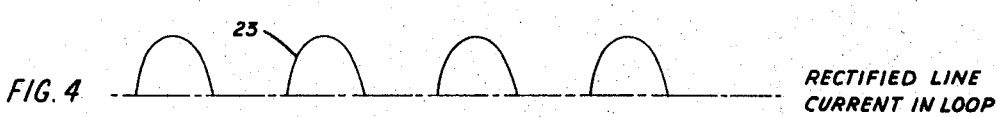
FIG. 4 — RECTIFIED LINE CURRENT IN LOOP
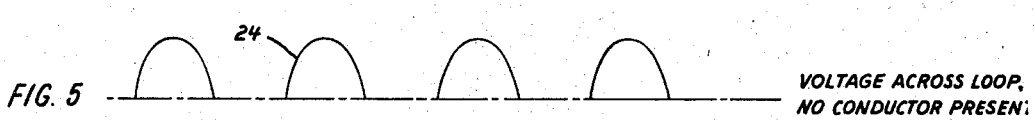
FIG. 5 — VOLTAGE ACROSS LOOP, NO CONDUCTOR PRESENT
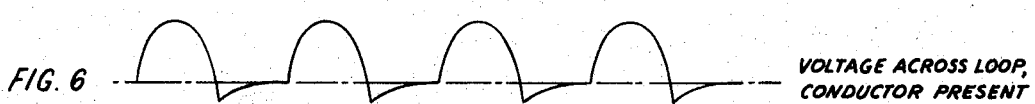
FIG. 6 — VOLTAGE ACROSS LOOP, CONDUCTOR PRESENT
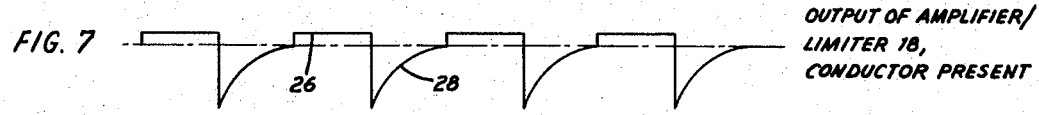
FIG. 7 — OUTPUT OF AMPLIFIER/LIMITER 18, CONDUCTOR PRESENT
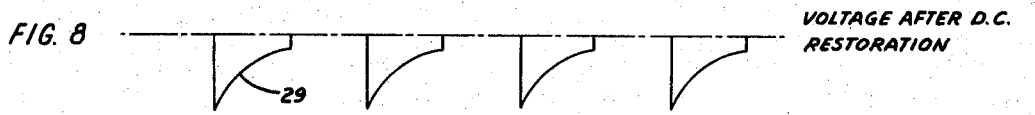
FIG. 8 — VOLTAGE AFTER D.C. RESTORATION
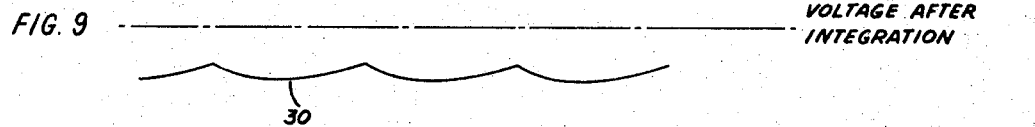
FIG. 9 — VOLTAGE AFTER INTEGRATION

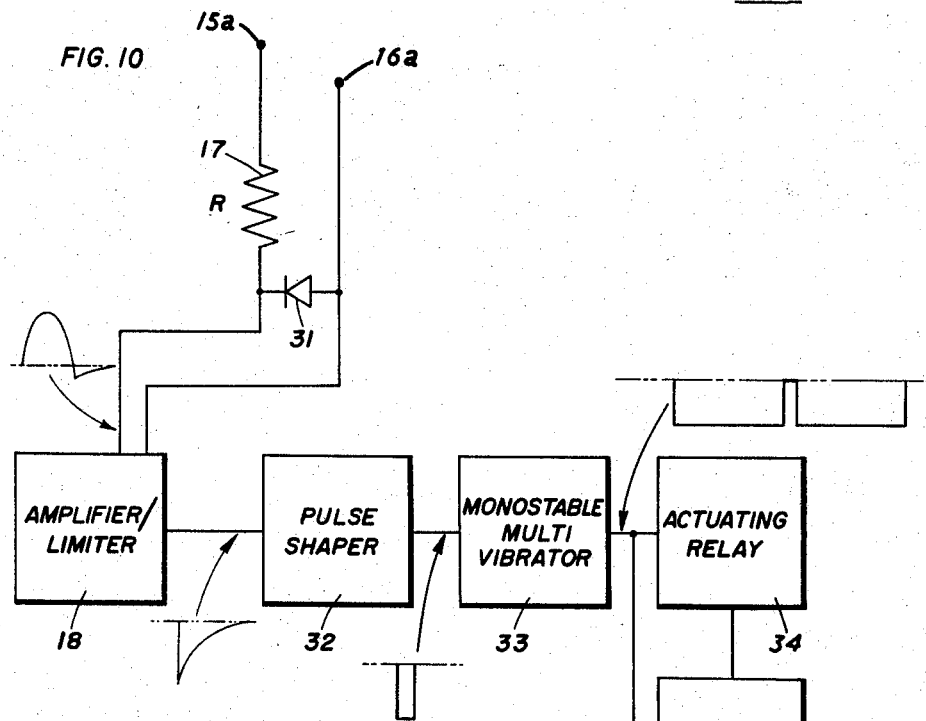
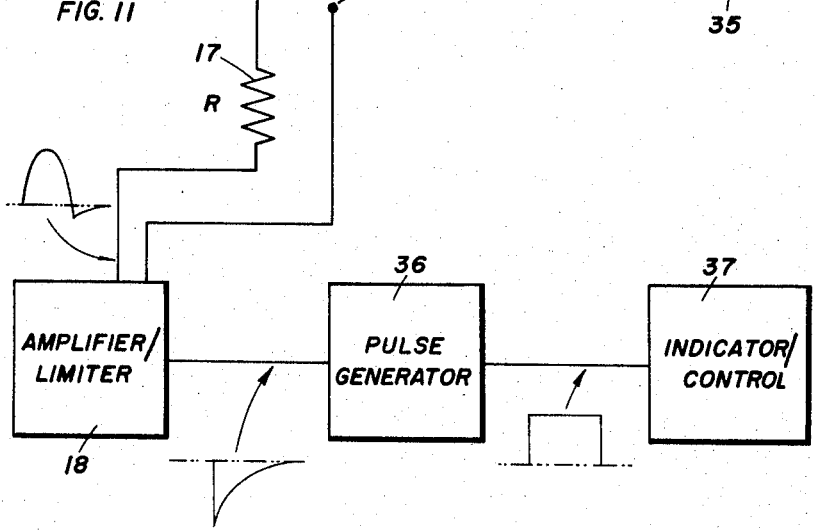

3,430,221
Patented Feb. 25, 1969

3,430,221
PROXIMITY DETECTOR
Anthony Rene Barringer, Willowdale, Ontario, Joseph Olivier Jacques Pronovost, Bramalea, Ontario, and Kenneth Alan Turner, Toronto, Ontario, Canada, assignors to Barringer Research Limited, Rexdale, Ontario, Canada, a corporation
Filed Sept. 27, 1965, Ser. No. 490,423
U.S. Cl. 340—258  5 Claims
Int. Cl. G08b *13/00;* G08g *1/00;* G01r *33/12*

ABSTRACT OF THE DISCLOSURE

A proximity detector employing a loop or coil positioned in proximity to an electrically conductive object to be detected. The coil is energized with electric current pulses of predetermined width with predetermined intervals between successive pulses. Transients induced in the coil due to decaying eddy currents flowing in the object are detected during the intervals between successive pulses, when the electromagnetic field created by the pulses is absent or is not time varying. The transients are separated from the remainder of the currents flowing in the coil and are converted into a signal suitable for controlling a relay, actuating a counter, etc.

---

Figure 12:
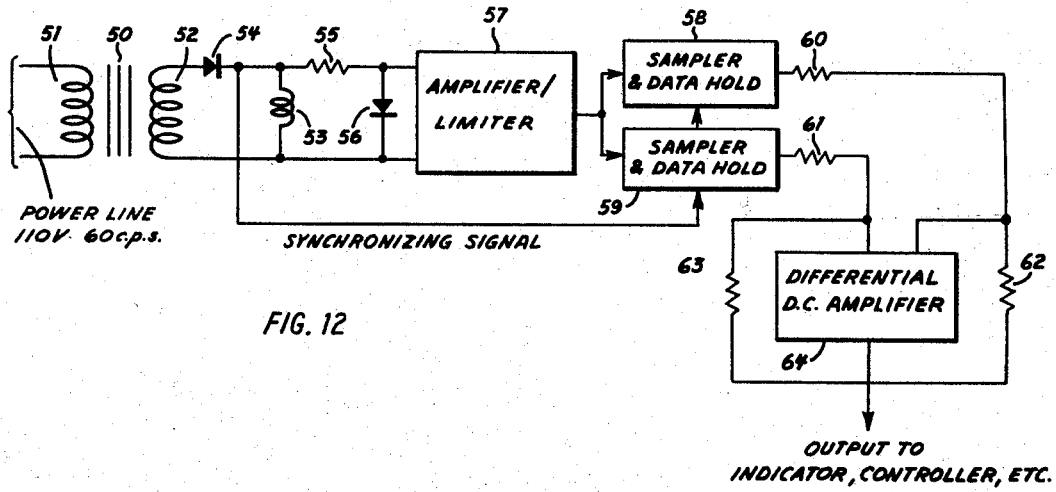

This invention relates to the remote sensing of electrically conductive objects and in particular to a proximity detector or switch that is activated by the presence of electrical conductors in an electromagnetic field.

It is known that an electromagnetic field is disturbed by the presence of an electrical conductor in the field. This principle has been utilized in prior electromagnetic sensing devices such as proximity switches and mine detectors. These devices operate by establishing a continuous electromagnetic field and they are provided with means for sensing field disturbances. The electromagnetic field is produced by the flow of magnetizing current in a loop or coil, and in one kind of prior device the presence of a conductor in the field causes observable changes in the loading of the loop. In another kind of prior device field disturbances are determined by observing anomalous amplitude variations in the strength of the magnetic field, and in yet another kind of prior device field disturbances are determined by observing phase variations which result when current is induced in the conductor.

The prior devices are not altogether satisfactory for various reasons. Some have only a short range and are relatively inaccurate. Others require careful stabilization and relatively complex circuitry in order to provide adequate sensitivity and accuracy. Low cost devices are often inaccurate and have a short range while more accurate and sensitive devices are often too expensive for many applications.

It is now proposed to sense the presence of conductive objects by means of a primary pulsating electromagnetic field rather than by a continuous electromagnetic field, and by detecting secondary field transients produced by decaying eddy currents induced in the conductive objects, during periods in which the primary electromagnetic field is either absent or is not time varying. For simplicity, the primary electromagnetic field is preferably formed by unipolar half sine pulses (referred to below as primary pulses) circulating in a loop, and the transients are observed during intervals between successive primary pulses. By using pulse techniques good sensitivity and good signal to noise ratios can be achieved with relatively simple circuitry. A single loop is used for both forming the primary electromagnetic field and for receiving the transients. The width of the primary pulses is preferably equal to the intervals between successive primary pulses, and the optimum repetition frequency of the primary pulses depends upon the characteristic time constant of the particular conductive objects to be sensed. For example, the duration of the decay transient for automobiles is of the order of 8 milliseconds, and this permits relatively long primary pulses, e.g. of the order of 8 milliseconds. On the other hand, for small metallic objects such as nails or the like, much shorter pulse widths (e.g. 1–100 microseconds) would be in order. Thus in order to attain a satisfactory overall signal to noise ratio for the system it is necessary to know (at least approximately) the characteristic time constant of the decay transient of the particular conductive object to be sensed, and to provide a pulse repetition frequency that is consistent with the time constant of the conductive object. In addition, the time constant of the trailing portion of the primary pulses should be relatively short compared with the time constant of the transients to avoid masking of the transients by the trailing edge of the primary pulses.

One application of the invention which is described in detail below is a traffic sensing system, and for convenience the primary pulses are obtained by rectifying mains or line voltages, commonly supplied at 110 volts and 60 c.p.s. Note that the period of one-half cycle at 60 c.p.s. is about 8 milliseconds, so this frequency correlates well with the duration of the transients for automobiles. This frequency is not especially critical, however, and other frequencies such as 25 c.p.s. or 400 c.p.s. could be used. The system employs a loop that is buried in the pavement of the road. Uses of the system include the control of traffic lights, counting the number of vehicles passing over the loop, and measuring speed by counting the number of transients attributable to a single vehicle. A somewhat more accurate measurement of speed could be obtained by using two loops spaced a measured distance apart and by electronically timing the vehicles between the two loops.

Another application of the invention is the measurement of the level of fluid in a tank. The tank must be of non-magnetic material so that the electromagnetic field can penetrate into the contents of the tank. Usually the time constant of the fluid in the tank is much shorter than the time constant of the tank itself (assuming the tank is a conductor) and therefore the earlier portion of the transient has a relatively fast time constant largely attributable to the fluid in the tank and the later portion of the transient has a slower time constant largely attributable to the tank itself. The amplitude of the earlier portion of the transient is a measure of the quantity of fluid in the tank.

Many other applications of the invention will readily come to mind. Generally speaking, the invention has application wherever a metal detector is required, for example in counting units on a production line, monitoring food processing lines to ensure that the food is free of metallic objects, and sensing the proximity of elevators.

The object of the invention is therefore to provide a proximity detector that is sensitive, reliable and relatively economical.

Figure 13:
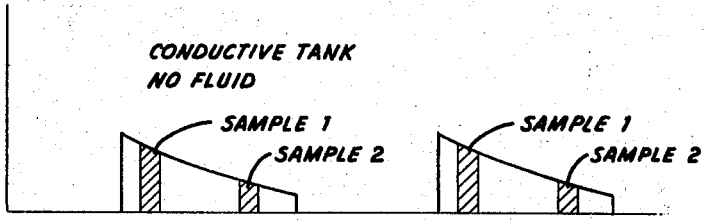
Figure 14:
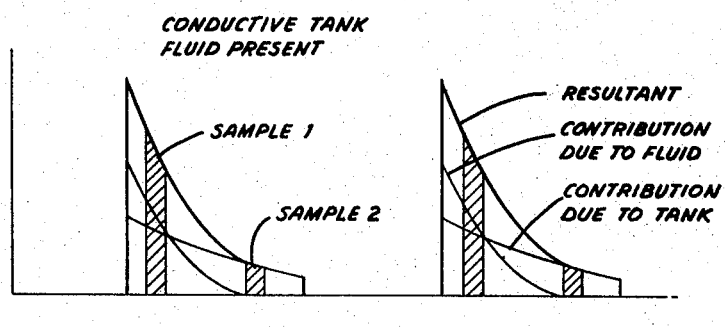

Preferred embodiments of the invention are illustrated in the accompanying drawings, wherein:

FIG. 1 is a block diagram of the circuit of a preferred form of the invention,

FIG. 2 is a perspective view of a typical installation near a traffic light that is controlled by the circuit of FIG. 1, FIGS. 3 to 9 show waveforms that appear in various stages of the circuit of FIG. 1, FIG. 10 is a block diagram of another form of a receiving portion of the circuit, FIG. 11 is a block diagram of yet another form of a receiving portion of the circuit, FIG. 12 is a block diagram of another embodiment of the invention for monitoring the level of fluid in a tank, and FIGS. 13 and 14 show typical transient waveforms in the circuit of FIG. 12.

In the following description the circuit of FIG. 1 will be described in relation to a traffic sensing system, by way of example. Referring to FIGS. 1 and 2, the circuit (which may be housed in a buried corrosion resistant casing C) is electrically connected to a coil 10 (hereinafter called a loop) and to a traffic light T. The loop 10 is buried in pavement P, and consists of approximately four turns arranged in a rectangular shape measuring approximately 2 feet by 5 feet. A transformer 12 has a primary winding 13 that is designed for a voltage and frequency corresponding to available power mains or lines, such as 110 volts at 60 c.p.s. (FIG. 3), and a secondary winding 11 that provides a voltage of about 20 volts. A lead 15 connects one leg of the secondary winding 11 with one end of the loop 10. A lead 16 connects a rectifier 14 in series between the other leg of the secondary winding 11 and the other end of the loop 10. The rectifier 14 can be any conventional silicon diode of suitable voltage and current ratings, and its function is to permit only half cycles of the transformer secondary voltage to circulate through the loop 10. FIG. 4 shows a series of positive half cycles separated by half cycle intervals, and these half cycles constitute primary pulses of magnetizing current which produce a magnetic field when they circulate in the loop 10. If necessary, a resistor (not shown) could be provided in the loop circuit to limit the current to the desired level.

The loop 10 is used both for forming the magnetic field and for receiving transients originating in conductors cut by the magnetic field. If no conductors are present, the voltage across the loop (FIG. 5) remains the same as that shown in FIG. 4, but if conductors are present transients of opposite polarity to the primary pulses are observed during the intervals between successive primary pulses (FIG. 6). The transients induced into the loop 10 are fed to an amplifier/limiter 18 which is connected across the leads 15 and 16 at points 15a and 16a. A resistor 17 of high resistance isolates the amplifier/limiter 18 from the primary pulses. The amplifier/limiter 18 amplifies the transients and limits the voltage of the primary pulses, as shown in FIG. 7. Thus, the output of the amplifier/limiter 18 consists of positive square waves 26 of relatively low amplitude and amplified transients 28 that are of negative polarity and exponential in form. The primary pulses could of course be of negative polarity instead of positive, and the resulting transients would then be positive. The amplifier/limiter 18 stage could be repeated several times if necessary in order to produce additional amplification of the transients 28.

The output of the amplifier/limiter 18 is fed to a D.C. restorer 19 which clamps the output voltage of the amplifier/limiter 18 to the level of the positive square waves 26, as shown in FIG. 8 so that the resulting signal consists of unipolar pulses 29. The output of the D.C. restorer 19 is fed to an integrator 20 which smooths the pulses 29 and produces a reasonably smooth direct current voltage 30 (FIG. 9). The direct current voltage 30 is fed to a control circuit 25 which may include a relay that is energized by the voltage 30. The relay could be used, for example, to control the traffic light T. If desired, the output of the integrator 20 could be recorded by a conventional recorder 21. Thus, if a vehicle is present over the loop 10, transients are induced in the loop 10 and are amplified by the remainder of the circuit, discriminated from the primary pulses, and changed into a reasonably smooth D.C. voltage for controlling a relay or the like. The number of cars passing over the loop could be determined by recording the output of the integrator 20, as indicated above.

FIG. 10 illustrates another embodiment of the receiving portion of the circuit which is particularly suitable where extraneous noise is very high, such as in the vicinity of street car tracks. Input to this circuit is obtained at points 15a and 16a as before but in this case an additional rectifier 31 is shunted across the input of the amplifier/limiter 18 to provide additional clipping of the primary pulses.

The output of the amplifier/limiter 18 is fed to a pulse shaper 32 which changes the shape of the transients into short square wave pulses. These square wave pulses are fed to the input of a monostable multivibrator 33 the output of which consists of square waves of greater amplitude and width than the input pulses. These output pulses are closely spaced so that they constitute a source of virtually steady direct current suitable for energizing various devices such as a relay 34. A digital counter 35 could also be connected to the output of the multivibrator 33 and to the relay 34 and arranged to respectively count either the number of individual pulses (multivibrator output) or the number of groups of pulses (relay) attributable to single vehicles or both.

FIG. 11 shows a further embodiment of the receiving portion of the circuit, and is somewhat simpler than the preceding receiving portions. It is intended for those applications where low cost is especially important and where the transients are reasonably strong. The circuit is similar to that described in FIG. 1 up to and including the amplifier/limiter 18, but the output of the amplifier/limiter 18 is fed to a pulse generator 36 that is adapted to produce square wave pulses when triggered by incoming transients. The multivibrator 36 can be a multivibrator or a silicon cotnrolled rectifier, and the resulting square wave pulses are fed to any suitable indicator/control device 37 such as a relay, a recorder, etc.

The circuit of FIG. 12 is suitable for measuring or monitoring the level of fluid in a tank, and it includes a transformer 50 having a primary winding 51 that is supplied, for example, with 110 volts A.C. at 60 c.p.s., and a secondary winding 52 which steps down the primary voltage to, for example, 20 volts A.C. A loop or coil 53 is energized by half cycles of the secondary voltage supplied by the transformer 50, rectification being performed by a rectifier 54. A series resistor 55 and a shunt diode 56 provide initial clipping of the primary pulses (half cycles) circulating in the coil 53, and the amplifier/limiter 57 serves the same function as the amplifier/limiter 18 described previously. The coil 53 may be in the form of a solenoid having approximately 100 turns and a radius of about 1", and it is intended that the coil 53 be fixed to the tank at any convenient place.

Before describing the rest of the circuit, reference is now made to FIGS. 13 and 14 which show typical transients which appear at the output of the amplifier/limiter 57. Assuming a conductive tank (e.g. a copper tank), if no liquid is present in the tank the transient is a pure exponential with a long time constant, as shown in FIG. 13. If, for example, a fluid of fairly high resistivity is present in the tank, the transient due to the fluid itself is also exponential but with a much shorter time constant. The resultant transient is the instantaneous sum of the two transients and at least during the first or early portion the transient is not a pure exponential (FIG. 14).

Two samplers 58 and 59 are adapted to sample the instantaneous amplitudes of the transients (samples 1 and 2, respectively, shown in FIGS. 13 and 14). A synchronizing signal derived from the rectifier 54 is fed to both samplers 58 and 59 to ensure that the samples are always taken at the same times during each transient. The outputs of the samplers 58 and 59 are fed to a proportional network consisting of resistors 60, 61, 62 and 63. The resistors 60 and 61 can be of the same value, and the ratios of the resistances of the resistors 62 and 63 is such that differential D.C. amplifier 64 gives zero output when a transient of pure exponential waveform is received (e.g.

when the tank is empty). When fluid is present in the tank, however, the output of the differential D.C. amplifier 64 is not zero because the transient then does not have a pure exponential waveform. Put another way, the circuit is arranged to be responsive to the variation of the ratio of the two samples from the value of the ratio with no fluid present in the tank at or about the level of the sensing coil. The output of the differential D.C. amplifier 64 can be used to drive a recorder, a suitably calibrated meter or any suitable control.

In the description above reference was made to primary pulses of half sine form, but other waveforms with trailing edges of short time constant compared to the time constant of the transient would also be suitable, such as square, sawtooth and quarter sine waveforms. Half sine pluses are preferred since they are so easily obtained, but it is recognized that there may be some applications where the transient has a very short time constant so that it would be preferable to use primary pulses having a shorter time constant trailing edge, such as a quarter sine pulse that drops very rapidly to zero from its peak.

What we claim as our invention is:

1. A proximity detector for detecting the presence of electrically conductive objects, comprising:
   (a) a coil positioned in proximity to the object to be detected,
   (b) a signal generator connected to said coil for energizing said coil with a repetition of electric current primary pulses of predetermined width and with intervals between them during which the electromagnetic field produced by said primary pulses is absent or not time varying,
   (c) receiving means for detecting signals induced in said coil including means for separating from said primary pulses any transient signals which are induced in said coil during said intervals, said transient signals being attributable to decaying eddy currents flowing in said object, and
   (d) control means connected to said receiving means and responsive to said transient signals for producing a control signal the existence of which is indicative of the presence of said object in proximity with said coil.

2. Apparatus as claimed in claim 1 wherein said primary pulses have trailing edges which have a short time constant compared with the time constant of said transients, wherein said primary pulses are rectified sine waves each having a period corresponding to the decay time of said transients, and wherein the interval between successive primary pulses is approximately equal to the width of said primary pulses.

3. Apparatus as claimed in claim 2 wherein the receiving means includes a limiting amplifier for amplifying the transients induced in said coil and clipping said primary pulses, and wherein said control means includes an integrator for smoothing said transients to provide a substantially steady direct current voltage.

4. Apparatus as claimed in claim 2 wherein the receiving means includes a limiting amplifier for amplifying the transients induced in said coil and clipping said primary pulses, and wherein the control means includes a pulse shaper for squaring the amplified transients, and a monostable multivibrator that is triggered by leading edges of the squared transients and which is adapted to produce closely spaced square waves for controlling a relay.

5. Apparatus as claimed in claim 1 wherein the receiving means includes a limiting amplifier for amplifying the transients induced in said coil and clipping said primary pulses, and wherein the control means includes a pulse generator triggered by leading edges of said transients for producing a repetition of square waves.

References Cited

UNITED STATES PATENTS

| 2,685,680 | 8/1954 | Williams | 340—38 |
| 2,790,071 | 4/1957 | Gunn | 340—38 |
| 3,103,655 | 9/1963 | Jones | 340—38 |
| 3,179,918 | 4/1965 | Hoeppel | 340—38 |

JOHN W. CALDWELL, *Primary Examiner.*

D. L. TRAFTON, *Assistant Examiner.*

U.S. Cl. X.R.

340—38; 324—41